United States Patent [19]

Hashimoto

[11] 4,118,721
[45] Oct. 3, 1978

[54] X-CONTACT DEVICE FOR BLADED SHUTTER

[75] Inventor: Akihiko Hashimoto, Hachioji, Japan

[73] Assignee: Olympus Optical Co., Ltd., Tokyo, Japan

[21] Appl. No.: 768,080

[22] Filed: Feb. 14, 1977

[30] Foreign Application Priority Data

Feb. 16, 1976 [JP] Japan .................................. 51/15592

[51] Int. Cl.[2] ............................................. G03B 15/03
[52] U.S. Cl. ..................................... 354/147; 354/230; 354/260
[58] Field of Search ............. 354/26, 27, 29, 137–139, 354/147, 230, 258–260

[56] References Cited

U.S. PATENT DOCUMENTS

| | | |
|---|---|---|
| 3,309,978 | 3/1967 | Kiper .................................... 354/259 |
| 3,994,007 | 11/1976 | Uchiyama et al. .................... 354/230 |

Primary Examiner—John Gonzales
Attorney, Agent, or Firm—Ostrolenk, Faber, Gerb & Soffen

[57] ABSTRACT

An X-contact device for a programmed shutter or a shutter of the type in which shutter blades also serve to determine a diaphragm aperture comprises means for detecting an end of a maximum opening period of the shutter, and an X-contact switch adapted to be closed by the detecting means. The switch, when closed, initiates an illumination of a strobo unit and the end of the maximum shutter opening period in order to provide a supplementary exposure added to a natural light exposure which has been maintained until that time.

3 Claims, 7 Drawing Figures

X-CONTACT DEVICE FOR BLADED SHUTTER

BACKGROUND OF THE INVENTION

The invention relates to an X-contact device for bladed shutter.

With a camera having an electrical shutter of TTL type or reflected light photometry type, the timing at which the shutter is closed when taking a picture under flashlight from a strobo unit is determined as a consequence of photometry which involves the photometry of reflected light from an object being photographed which is exposed to the flashlight. This ensures a satisfactory photographing operation under flashlight. However, when a programmed shutter is used for example, the flashlight is normally initiated at the beginning of the maximum opening period. This involves the likelihood that the shutter may remain open for an indefinite period subsequent to the flashlight illumination from the strobo unit, preventing a proper exposure from being achieved. This resulted in the necessity of independently controlling a diaphragm aperture and a shutter speed, particularly in daytime synchro-flash photography.

If the flashlight from a strobo unit is initiated during the maximum opening period with such a programmed shutter, there occurs a difficulty that the exposure takes place principally with the flashlight, while external light has little contribution to the exposure.

SUMMARY OF THE INVENTION

It is an object of the invention to provide an X-contact device for a bladed shutter such as a program shutter, namely, of the type in which shutter blades also function as a diaphragm, which permits an exposure by natural light through a combination of preset diaphragm aperture and shutter speed in the usual manner and which enables an initiation of flashlight from a strobo unit toward the end of a maximum shutter opening period, thereby assuring a satisfactory photography by optimizing the proportion of ordinary taking light and flashlight in the similar manner as with an electrical shutter of TTL type or reflected light photometry type.

In accordance with the invention, a flashlight from a strobo unit may be initiated toward the end of a period during which the shutter is fully open to a given diaphragm value, whereby the flashlight contributes to the total exposure in a manner to supplement the exposure fraction produced by natural light. This assures a proper contribution of the exposure fraction of natural light to the formation of an image field, while enabling its combined use with synchro-flash photography. When taking a picture under rear light, any resulting under-exposure may be fully compensated for. With the device of the invention, the diaphragm and the shutter may be operated as scheduled on the basis of photometric results, without need to consider the timing of synchronization, thus greatly facilitating and reliably enabling daytime synchro-flash photography.

DESCRIPTION OF PREFERRED EMBODIMENT

Figure 1:
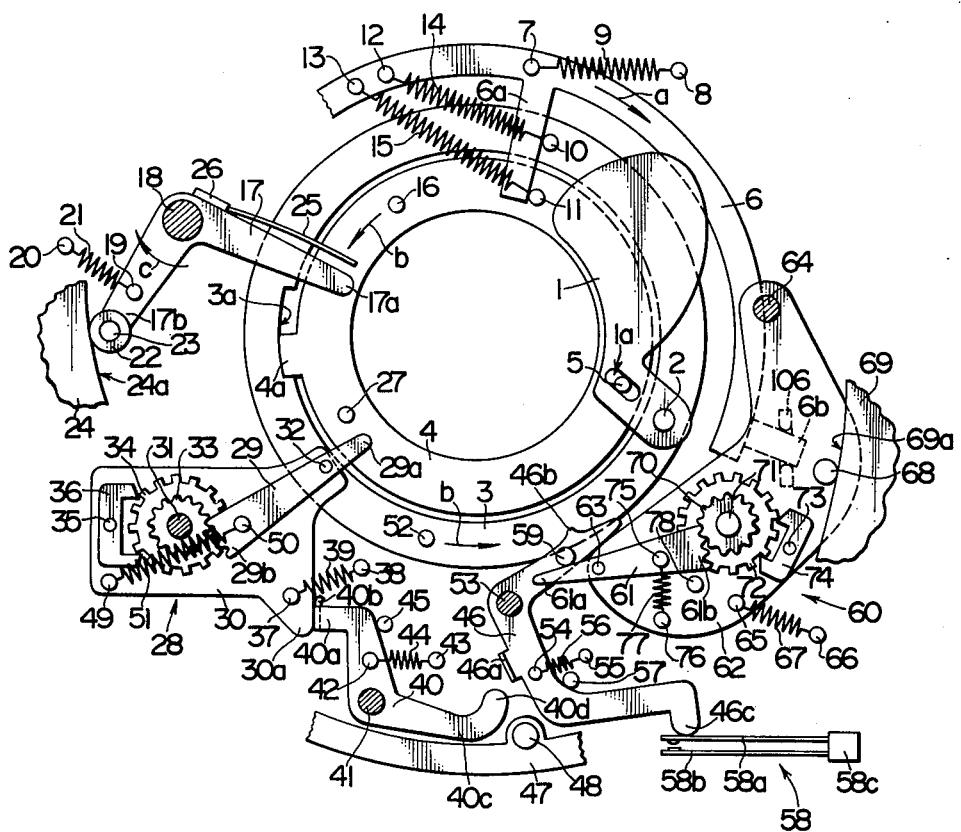
FIGS. 1 to 4 are front views of a bladed shutter for camera with focal plane shutter which is constructed in accordance with one embodiment of the invention, these Figures also illustrating the manners of operation.

Referring to FIG. 1, there is shown a shutter blade 1, one end of which is rotatably mounted by a pin 2 on a shutter closing ring 3. Adjacent to the pin 2, the shutter blade 1 is formed with an elongated slot 1a, into which is fitted a pin 5 fixedly mounted on a shutter opening ring 4. The two rings 3, 4 are rotatably disposed in concentric relationship with each other, and operate in an interrelated manner by engaging a projection 4a on the left-hand outer periphery of the shutter opening ring 4 with a notch 3a formed in the left-hand inner periphery of the shutter closing ring 3.

The shutter closing ring 3 is externally surrounded by a shutter charging ring 6 which is rotatably mounted in concentric relationship with both rings 3, 4. A coiled spring 9 extends between a pin 7 fixedly mounted on the upper portion of the ring 6 and a stationary pin 8 for urging the ring 6 to rotate in the direction indicated by an arrow a. The ring 6 has a radially inwardly extending arm 6a in its upper portion, which is urged by the coiled spring 9 to bear against a pair of pins 10, 11 which are in turn fixedly mounted on the shutter closing ring 3 and the shutter opening 4, respectively. On its portion to the left of the pin 7, the ring 6 fixedly carries a pair of pins 12, 13, and a pair of shutter charging, coiled springs 14, 15 extend between the pins 12, 13 and the pins 10, 11, respectively. On its right-hand portion, the ring 6 has a radially outwardly extending arm 6b, which is engaged by a diaphragm lever 106 provided on the part of a camera.

In its upper, left-hand portion as viewed in FIG. 1, the shutter opening ring 4 fixedly carries a diaphragm pin 16, and located on the circular path of movement of the pin 16, indicated by an arrow b, is one arm 17a of a diaphragm presetting lever 17, which is in turn rotatably mounted on a stud 18. The lever includes another arm 17b having a pin 19 fixedly mounted thereon, and a coiled spring 21 extends between the pin 19 and a stationary pin 20 for urging the lever to rotate in the direction indicated by an arrow c. The free end of the arm 17b has a pivot 23 on which a roller 22 is rotatably mounted, the roller 22 being held in abutment against a cam edge 24a of a diaphragm cam 24 under the resilience of the coiled spring 21. Adjacent to the stud 18, the arm 17a of the lever 17 has one end of a buffering leaf spring 25 fixedly mounted on the upper edge thereof, with a mounting member 26 interposed therebetween, the free end of the leaf spring being located on the path of movement of the diaphragm pin 16 so as to provide a buffering action thereon as the pin 16 bears against the arm 17a. The diaphragm pin 16, the diaphragm presetting lever 17 and the diaphragm cam 24 constitute together a diahragm mechanism of the bladed shutter.

A governor pin 27 for braking the opening movement of the shutter is fixedly mounted on the lower, left-hand portion of the shutter opening ring 4, and has a path of movement, indicated by the arrow b, on which is located a braking arm 29a of a sector-shaped gear 29 associated with a governor 28 which is designed to apply a braking action upon the opening movement of the shutter. The governor 28 includes a support plate 30 which is rotatably mounted on a shaft 31, and the sector-shaped gear 29 is rotatably mounted on another pin 32 which is fixedly mounted on the support plate 30 in the right-hand portion thereof. The sector-shaped gear 29 has teeth 29b which mesh with a pinion 33 rotatably mounted on the shaft 31. An escape wheel 34 is integrally formed with the pinion 33 and meshes with an anchor 36 which is pivotally mounted on a pin 35 fixedly mounted on the support plate 30. A pin 37 is fixedly mounted on the support plate 30 in the lower, right-hand portion thereof, and a coiled spring 39 extends between the pin 37 and a stationary pin 38 for urging the support plate 30 to rotate counter-clockwise about the shaft 31. As a consequence of such bias, the support plate 30 has its lower, right-hand lateral edge 30a held in abutment against a folded end 40b of an arm 40a of an operation converting lever 40. The operation converting lever 40 is rotatably mounted on a stud 41, and is biased by a coiled spring 44, extending between a pin 42 fixedly mounted thereon and a stationary pin 43, to have its arm 40a in bearing arrangement with a stop 45. The lever 40 includes another arm 40c which is formed with a detent 40d, located adjacent to a portion 46a which is formed on one arm of a control lever 46 (which will be described in further detail later) controlling the closing movement of the shutter. At a position below the arm 40c, a switching pin 48 is fixedly mounted on an operation switching ring 47. In the initial condition shown in FIG. 1, the detent 40d of the operation converting lever 40 is removed from the portion 46a of the control lever 46, and the switching pin 48 on the operation switching ring 47 is removed from the arm 40c of the operation converting lever 40. A pin 49 is fixedly mounted on the support plate 30 of the governor 28 in the lower, left-hand portion thereof, and a pin 50 is fixedly mounted on the sector-shaped gear 50 adjacent to the teeth 29b. A coiled spring 51 extends between the pins 49 and 50 for adjusting the position of the sector-shaped gear 29 in a manner such that the braking arm 29a of the gear 29 is just located on the path of movement of the governor pin 27 when the support plate is in its initial condition shown in FIG. 1. Under this condition, a leading one of the teeth 29b of the gear 29 meshes with the pinion 33.

A governor pin 52 for controlling the closing movement of the shutter is fixedly mounted on the shutter closing ring 3 in the lower portion thereof, as viewed in FIG. 1. The pin 52 has a path of movement and a direction which is similar to the direction as the path of movement of the governor pin 27, as indicated by the arrow b, and a braking tab 46b formed on the upper edge of another arm of the control lever 46 is located on this path.

The control lever 46 is pivotally mounted on a stud 53, and is biased to rotate counter-clockwise about the stud 53 by a coiled spring 56 which extends between a pin 54 and a stationary pin 55, the pin 54 being fixedly mounted thereon adjacent to the portion 46a. As a result of such bias, the arm of the lever 46 which contains the pin 54 is held in abutment against a stop 57. One arm of the lever 46 extends to the right, as viewed in FIG. 1, and has a switch actuator 46c formed on its free end, which is located adjacent to one resilient contact blade 58a of an X-contact switch 58. The switch 58 includes another resilient contact blade 58b, which together with the contact blade 58a is mounted on an insulating support 58c. The switch 58 is of a normally open type, and remains open in the initial condition shown in FIG. 1.

The arm of the control lever 46 which contains the braking tab 46b has a pressure pin 59 fixedly mounted thereon, which bears against a braking arm 61a of a sector-shaped gear 61 of a governor 60 which controls the closing movement of the shutter. The sector-shaped gear 61 is rotatably mounted on a pin 63 which is fixedly mounted on the left-hand end of a support plate 62 of the governor 60. The support plate 62 has its one end, namely, the upper portion thereof as viewed in FIG. 1, rotatably mounted on a shaft 64, and is urged to rotate counter-clockwise about the shaft 64 by a coiled spring 67 which extends between a pin 65 fixedly mounted on the lower portion thereof and a stationary pin 66, whereby a pin 68 fixedly mounted adjacent to the right-hand side of the central portion thereof bears against a cam edge 69a of a shutter cam 69. The support plate 62 centrally carries a shaft 71 on which a pinion 70 is rotatably mounted and meshes with the teeth 61b of the gear 61. An escape wheel 72 integral with the pinion 70 is mounted on the shaft 71, and is engaged by an anchor 74 which is rotatably mounted on a pin 73 which is in turn fixedly mounted on the support plate 62. A pin 75 is fixedly mounted on the gear 61 intermediate the pin 63 and the teeth 61b, and is engaged by one end of a coiled spring 77, the other end of which is anchored to a pin 76 which is fixedly mounted on the support plate 62, whereby the gear 61 is urged in a direction to normally maintain the braking arm 61a in abutment against the pressure pin 59 on the control lever 46. The extent of rotation of the gear 61 is limited by a stop 78 which is fixedly mounted on the support plate 62.

Figure 2:
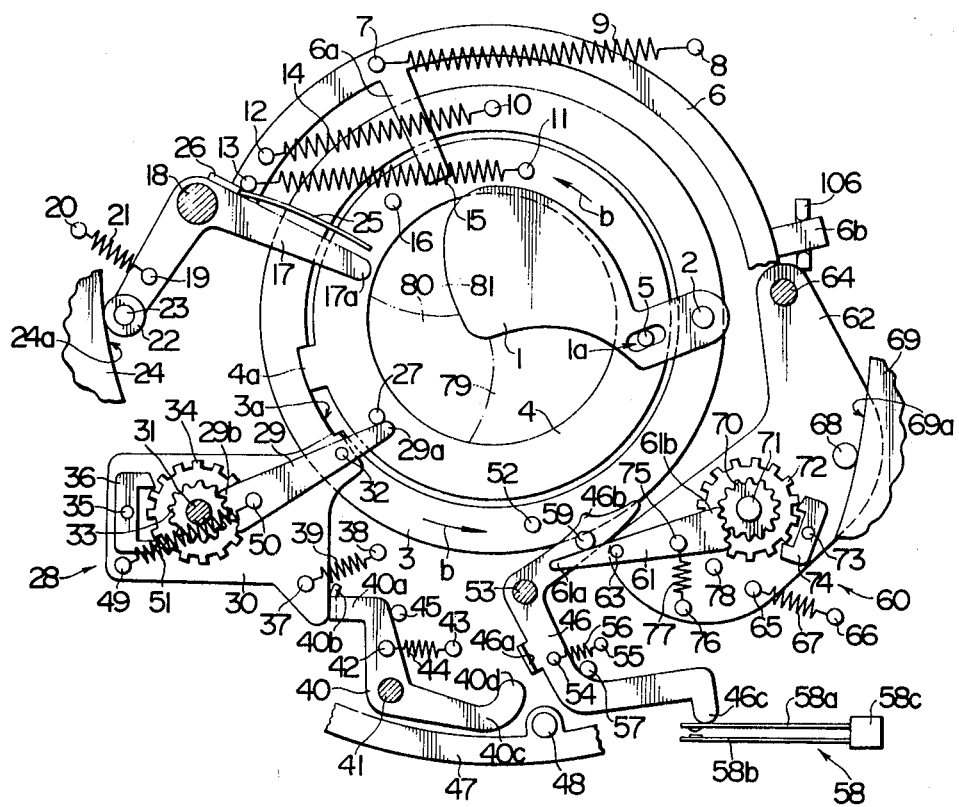
Figure 3:
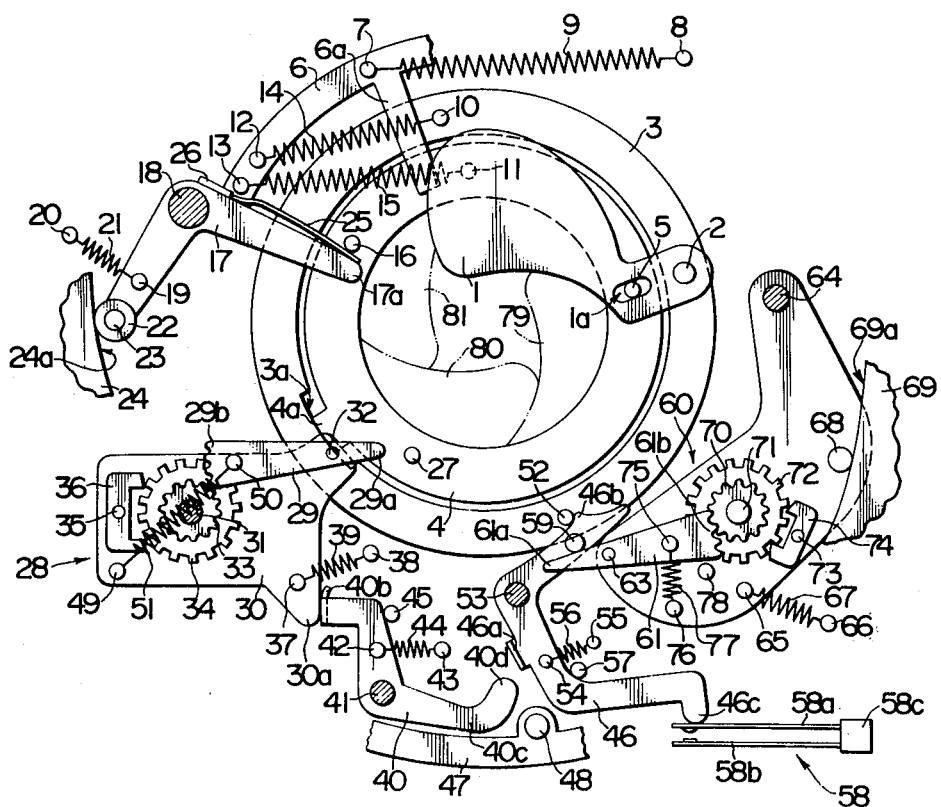
Figure 4:
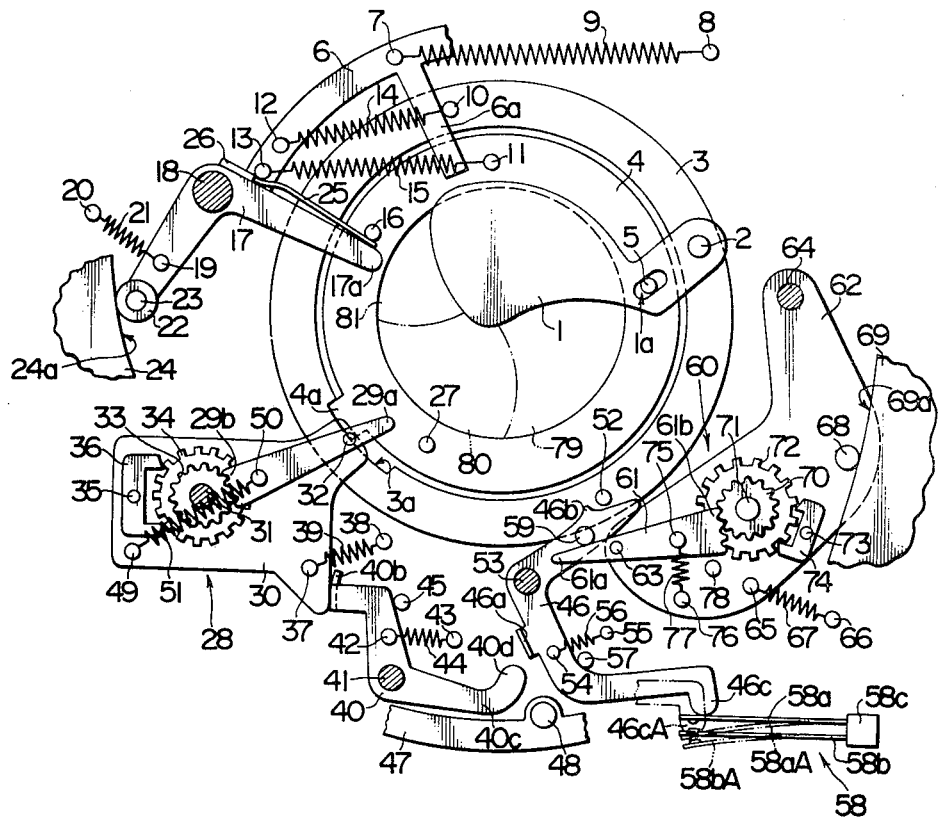

In the bladed shutter described above, both the shutter closing ring 3 and the shutter opening ring 4 also support a plurality of other shutter blades 79, 80 and 81, shown in phantom lines in FIGS. 2 to 4, in a manner similar to the supports of shutter blade 1. The taking light path which extends through the shutter opening ring 4 is either open or closed by operation of the shutter blades 1, 79 to 81. In the initial condition shown in FIG. 1, these shutter blades maintain the taking light path fully open. It should be understood that the configuration and the number of the shutter blades as well as the manner of their support on the rings 3, 4 can be changed as desired.

Figure 5:
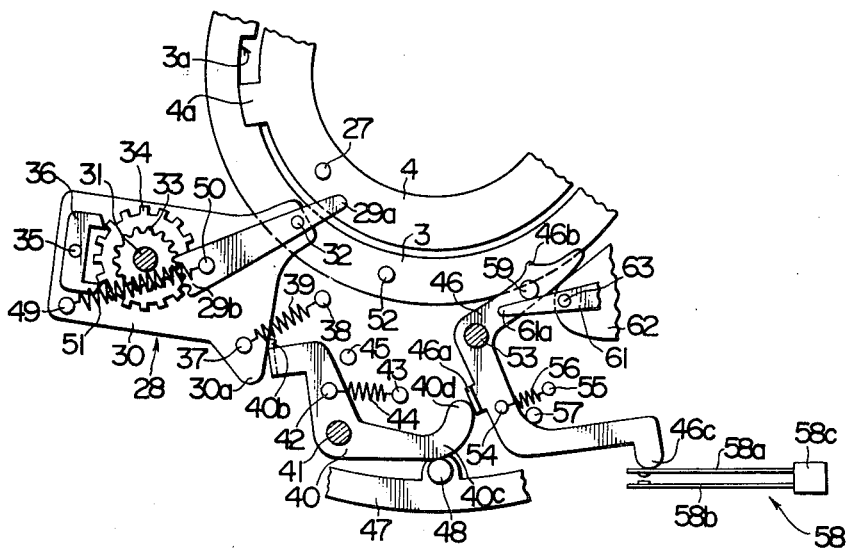
FIG. 5 is a fragmentary front view of the bladed shutter shown in FIG. 1, illustrating the operation thereof.
Figure 6:
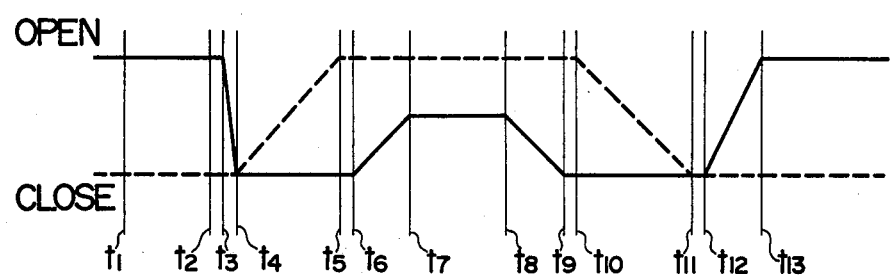
FIG. 6 is a timing chart which illustrates the operation of the bladed shutter.

Referring to FIGS. 1 to 6, the operation of the bladed shutter will be described. Initially, an interchangeable lens (not shown) having the bladed shutter assembled therein is mounted on a camera (not shown) also equipped with a focal plane shutter. The diaphragm lever 106 provided on the part of the camera engages the arm 6b of the shutter charging ring 6 at time $t_1$, shown in the timing diagram of FIG. 6. At this time, the various components of the bladed shutter assume their initial positions shown in FIG. 1. It is to be noted that the diaphragm lever 106 may be replaced by a shutter drive lever. In FIG. 6, the degree of opening of the shutter blades 1, 79 to 81 at various times $t_1, t_2 \ldots$ is indicated in solid line while the degree of opening of a focal plane shutter (not shown) which is inherently provided on the camera is indicated in broken lines. Under the initial condition or at time $t_1$, all of the shutter blades remain fully open while the focal plane shutter is fully closed.

Now a film winding operation of the camera may be performed, and the diaphragm cam 24 and the shutter cam 69 of the bladed shutter may be externally operated to optimum settings. When the diaphragm cam 24 is operated, it causes the diaphragm presetting lever 17 to rotate, adjusting the arm 17a thereof and the diaphragm pin 16 on the shutter opening ring 4 to optimum positions, thus determining a diaphragm aperture. When the shutter cam 69 is operated, it causes the governor 60 to rock, providing an optimum degree of engagement between the braking arm 61a of the gear 61 and the pressure pin 59 on the control lever 46, thus determining a shutter speed. At this time, the shutter speed of the focal plane shutter is preset to a value which is slightly slower than the shutter speed preset in the bladed shutter. It should be understood that the setting of the diaphragm and shutter speed values may be performed prior to the film winding operation.

When a shutter release is triggered on the camera under this condition, the diaphragm lever 106 moves from its position shown in FIG. 1 to its position shown in FIG. 2, driving the arm 6b of the shutter charging ring 6 from a position shown in FIG. 1 to a position shown in FIG. 2. The resulting counter-clockwise rotation of the ring 6 charges the coiled springs 14, 15 by extending them, whereby both the shutter closing ring 3 and the shutter opening ring 4 are energized for rotation in the direction of the arrow b. Also the coiled spring 9 is charged, storing a resilient energy for returning the shutter charging ring 6 to its initial position upon completion of a shutter operation.

The timing at which a shutter release is triggered is indicated by time $t_2$ in FIG. 6, and at the same time as both coiled springs 14, 15 are stressed in the manner mentioned above, they cause the two rings 3, 4 to be displaced in the direction of the arrow b while maintaining the abutment of the projection 4a on the ring 4 against the leading edge of the notch 3a formed in the ring 3. Subsequently at time $t_3$ when the pin 27 on the shutter opening ring 7 bears against the braking arm 29a of the gear 29 of the governor 28, the shutter opening ring 4 is braked by the governor 28. When the shutter opening ring 4 is braked by the governor 28, only the shutter closing ring 3 which has been rotating together with the ring 4 continues to rotate. A rotation of the shutter closing ring alone ahead of the shutter opening ring 4 results in a gradual closing of the shutter blades 1, 79 to 81, and the taking light path is fully closed at time $t_4$ when the projection 4a on the ring 4 bears against the trailing edge of the notch 3a formed in the ring 3, as shown in FIG. 2.

At time $t_4$ when the taking light path is fully closed, the first blind of the focal plane shutter provided on the camera initiates its running in association with the upward movement of a mirror, which is initiated in response to a shutter release, and fully opens the focal plane shutter at time $t_5$. The time $t_4$ when the bladed shutter is fully closed is established so as to precede the initiation of running of the first blind of the focal plane shutter.

At time $t_5$ when the running of the first blind of the focal plane shutter is terminated and the latter becomes fully open, the shutter opening ring 4 which has been constrained by the governor 28 until then has its pin 27 released from the governor 28, resuming rotation together with the shutter closing ring 3. The term interval during which the braking action of the governor 28 is applied is determined to an optimum value by design. Subsequently, when the governor pin 52 on the shutter closing ring 3 bears against the braking tab 46b of the control lever 46, the ring 3 is now braked by the governor 60 through the lever 46 and the sector-shaped gear 61, and only the ring 4 continues to rotate ahead of the ring 3. This timing is indicated at $t_6$ in FIG. 6, and the running of the shutter opening ring 4 ahead of the shutter closing ring 3 causes the shutter blades 1, 79 to 81 to be opened. When the diaphragm pin 16 on the shutter opening ring 4 bears against the arm 17a of the diaphragm presetting lever 17 through the buffering spring 25, the opening movement of the shutter blades 1, 79 to 81 is interrupted, and therefore the taking light path is opened to a predetermined diaphragm aperture. This timing is indicated at $t_7$ in FIG. 6. The corresponding positions of the various parts of the bladed shutter are shown in FIG. 3.

The opening of the shutter blades 1, 79 to 81 to the predetermined diaphragm aperture is maintained subsequent to the abutment of the diaphragm pin 16 against the arm 17a of the diaphragm presetting lever 17 until time $t_8$ when the governor pin 52 is released from the braking tab 46b of the control lever 46 by the termination of operation of the governor 60. At this time, the pin 52 rotates while driving the lever 46 clockwise about the stud 53, so that the actuator 46c of the lever 46 presses against the resilient contact blade 58a, as indicated in phantom line 46cA in FIG. 4, thus bringing it into contact with the other resilient contact blade 58b (shown in phantom lines 58aA, 58bA) to close the X-contact switch 58. The closure of the switch 58 represents a closure of the X-contact, so that a strobo unit, if mounted on the camera, can be activated to produce a flash illumination. This takes place toward the end of the time interval during which the shutter blades maintain a maximum opening determined by a diaphragm aperture, or at time $t_8$.

When the governor pin 52 moves past the braking tab 46b of the control lever 46, the shutter closing ring 3 continues to rotate, so that the shutter blades 1, 79 to 81 initiate a closing operation until the opening is fully closed at time $t_9$ (see FIG. 4) since the diaphragm pin 16 on the shutter opening ring 4 bears against the diaphragm presetting lever 17 to stop the shutter opening ring 4. When the pin 52 moves away from the lever 46, the latter allows the switch 58 to be opened.

The second blind (not shown) of the focal plane shutter begins its running immediately after the shutter blades are fully closed or at time $t_{10}$, and terminates its running at time $t_{11}$, fully closing the focal plane shutter. Subsequently at time $t_{12}$, after the focal plane shutter is fully closed, the diaphragm lever 106 on the camera returns from the position shown in FIG. 2 to the position shown in FIG. 1. In interlocked relationship therewith, the shutter charging ring 6 returns to its initial position. This causes the shutter closing ring 3 and the shutter opening ring 4 to be returned to their initial positions, initiating reopening of the the shutter blades 1, 79 to 81 until they are fully open at time $t_{13}$. The various components of the bladed shutter have now returned to their respective initial positions shown in FIG. 1, thus completing one photographic cycle.

By turning the operation switching ring 47 clockwise from its position shown in FIG. 1 to its position shown in FIG. 5, the described photographic operation of the bladed shutter may only involve an automatic diaphragm aperture setting.

Specifically, when the operation switching ring 47 is moved to the position shown in FIG. 5, the switching pin 48 raises the arm 40c of the operation converting lever 40, which therefore rotates counter-clockwise about the stud 41. The detent 40d of the lever 40 bears against the portion 46a of the control lever 46 to lock it while its arm 40a moves the support plate 30 of the governor 28 so as to retract the braking arm 29a of the sector-shaped gear 29 out of the path of rotation of the governor pin 27. When the braking arm 29a is moved out of the path of rotation of the pin 27, the shutter opening ring 4 responds to a shutter release by rotating in one stroke in the direction of the arrow b from its initial position shown in FIG. 1 until the diaphragm pin 16 thereon bears against the diaphragm presetting lever 17. The shutter closing ring 3 also rotates in one stroke in the same direction until the governor pin 52 thereon bears against the braking tab 46b on the control lever 46. At this time, the diaphragm presetting lever 17 is locked in a diahragm position which is determined by the diaphragm cam 24, and the control lever 46 is locked against movement by the detent 40d, so that both rings 3, 4 are stopped at positions shown in FIG. 3, allowing the shutter blades 1, 79 to 81 to be opened to a given diaphragm aperture. In this instance, the shutter function is replaced by the focal plane shutter and the bladed shutter only serves as a diaphragm. Thus, the camera may be used as a usual camera with the focal plane shutter.

Figure 7:
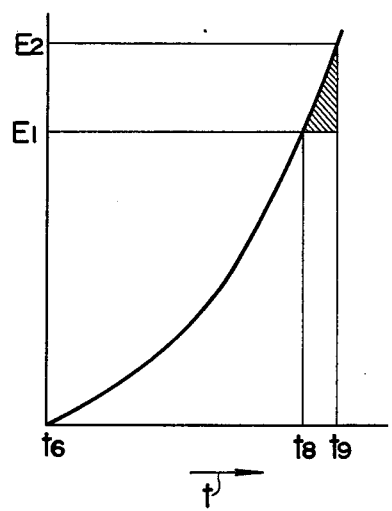
FIG. 7 graphically shows a manner of exposure achieved by the X-contact of the bladed shutter.

With the bladed shutter of the invention, the shutter blades 1, 79 to 81 are opened to a maximum value corresponding to a given diaphragm aperture, and the switch 58 is closed to provide a flash illumination by a strobo unit toward the end of the maximum opening or at time $t_8$ after a sufficient exposure has been given by natural light (FIG. 7).

The light intensity increases from zero to $E_1$ from time $t_6$ when the shutter blades begin to be opened until time $t_8$ when the switch 58 is closed, the exposure during such time interval being given by natural light. When the switch 58 is closed and a flashlight illumination from a strobo unit is provided, the light intensity is increased from $E_1$ to $E_2$ until time $t_9$ is reached, thus providing an additional exposure from the strobo unit, as indicated by the hatched area.

It is to be noted that means for closing the X-contact switch is not limited to the control lever 46 interlocked with the governor pin 52, but may comprise any other suitable means such as a cam.

What is claimed is:

1. A shutter assembly comprising concentric opening and closing rings and a plurality of blades pivotally coupled to both rings;
   charging means for biasing both said rings in a first direction;
   diaphragm means for engaging a projection on said opening ring to set a desired shutter opening;
   means for restraining a projection on the closing ring when the diaphragm is in the full open setting;
   adjustable governor means for releasing the restraining means after a settable predetermined time interval;
   an X-switch contact and means responsive to the end of said time interval for actuating the X-switch to enable initiation of a flash operation during the time that the bladed shutter begins to close.

2. A shutter assembly of the type which includes a plurality of shutter blades and operates both as a bladed shutter and a diaphragm, said shutter assembly comprising:
   detecting means for detecting an end portion of a maximum shutter opening period;
   an X-contact switch adapted to be closed by said detecting means and also adapted to enable a strobo unit when closed by said detecting means; and
   said detecting means comprising a lever which is driven by said shutter assembly and which closes said switch towards said end of said maximum shutter opening period whereby a flash of light from said strobo unit may be initiated at said end of said maximum shutter opening period so as to supply a supplementary exposure to an exposure fraction which has been produced by natural light until that time.

3. A shutter according to claim 2, further including an exposure adjusting shutter cam, and a governor controlled by the cam for maintaining the shutter at its maximum opening during said period.

* * * * *